United States Patent
Kober

[15] 3,687,479
[45] Aug. 29, 1972

[54] WHEEL AXLE FOR SINGLE-AXLE VEHICLE

[72] Inventor: Kurt Kober, Kleinkotz-Schwaben, Germany

[73] Assignee: Kober, Alois Ag Maschinenfabrik, Grosskotz/Schwaben, Germany

[22] Filed: March 27, 1970

[21] Appl. No.: 23,403

[52] U.S. Cl. ............. 280/124 R, 267/21 A, 267/57.1
[51] Int. Cl. ................................................. B60g 11/22
[58] Field of Search ....... 280/124; 267/21, 57.1, 63 A

[56] References Cited

UNITED STATES PATENTS 2,712,742   7/1955   Neidhart .............. 267/21 A X
2,729,442   1/1956   Neidhart .............. 267/57.1 X
3,436,069   4/1969   Henschen ............. 280/124 X

*Primary Examiner*—Philip Goodman
*Attorney*—Karl F. Ross

[57] ABSTRACT

A wheel axle for a single-axle trailer has a fixed axle housing in the form of a polygonal tube and an inner rod of polygonal cross-section traversing that tube as a support for a pair of wheel mounts secured to its ends; the polygon of the outer tube has twice as many corners as that of the inner rod to form therewith a set of pockets of generally triangular profile with obtuse vertex angles receiving elongate, elastically deformable damping strips to enable limited relative rotation between the rod and the tube. The strips may be partly received in surface depressions of the rod.

9 Claims, 5 Drawing Figures

KURT KOBER
INVENTOR.

BY   Karl F. Ross
     Attorney

WHEEL AXLE FOR SINGLE-AXLE VEHICLE

My present invention relates to a wheel axle for a vehicle of the single-axle type, such as a semitrailer, in which a pair of wheels are eccentrically mounted on a transverse rod received in a fixed axle housing with freedom of limited relative rotation against a restoring force.

In house trailers and other vehicles of this character, it has already been proposed to insert shock-absorbing strips of elastically deformable material in narrow clearances between the rod and the surrounding axle housing which for this purpose are made of noncircular cross-section. In these prior systems the two cross-sections where designed as geometrically similar polygons relatively offset so that the corners of the inner polygon normally confronted the centers of the sides of the outer polygon and vice versa to form a plurality of elongate pockets, equal to the number of corners per polygon, receiving the damping strips. With triangular or square cross-sections, these strips where confined between sides adjoining each other at acute or right angles which greatly restricted their mobility. Polygons with more than four sides, on the other hand, were found to be impractical since the obtuse angles of the rod surface would allow the rod to turn past the deformable damping strips. In these earlier arrangements, therefore, the damping strips tended to fatigue after a relatively short period of use with resulting lessening of their shock-absorbing quality.

The general object of my present invention, accordingly, is to provide an improved wheel axle of this type avoiding the aforestated drawbacks.

According to an important feature of my invention, this object is realized by making the cross-section of the axle housing a polygon of higher order than that of the rod surrounded thereby, preferably with a number of corners double that of the rod polygon, all the sides of the axle housing adjoining one another at obtuse angles even though the rod profile is generally triangular or square. The damping strips, while unable to escape from their pockets upon relative rotation of the rod and the axle housing, are thus free to undergo a substantial amount of rolling deformation with a wide stress distribution which prevents local fatiguing.

My improved wheel axle, therefore, constitutes a soft spring in opposing minor displacements of the wheel mounts and stiffens only gradually upon larger excursions from a normal wheel position. Even severe shocks on rough roads are cushioned within the axle and transmitted to the vehicle body only in greatly attenuated form. With the rod acting as a torsion bar, any relative swinging of the two wheel mounts is also elastically absorbed with partial deformation of the damping strips. The rod, for this purpose, could be hollow metal profile or a solid resinous member formed, for example, by extrusion.

According to another feature of my invention, the sides of the generally polygonal rod are not flat but concave so as to form elongate troughs partly receiving the respective damping strips. Though advantageously in this case, too, the rod has a cross-section of not more than four corners surrounded by a housing tube with twice the number of corners, I have found that the hollowing of the rod sides prevents any escape of the damping strips even if the number of these sides is greater than four. In a preferred embodiment, the corners of the outer tube confronting these concavities are rounded with approximately the same radius of curvature as the troughs so that the damping strips are compressed therebetween, in the normal position, to a substantially elliptical profile.

The invention will be described in greater detail hereinafter with reference to the accompanying drawing in which.

Figure 1:
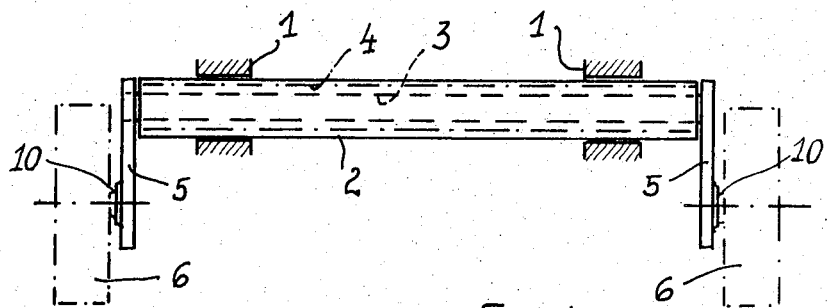
FIG. 1 is a somewhat diagrammatic elevational view of a wheel axle according to the invention.

In FIG. 1 I have shown part of a frame 1 of a semitrailer or similar single-axle vehicle rigidly secured to a tubular axle housing 2 of generally polygonal cross-section as more fully described hereinafter. Nested in axle housing 2 is a rod 3, also of generally polygonal cross-section, whose extremities project from the ends of the tube and are secured to a pair of lateral arms 5 forming bearings 10 for two wheels 6. Rod 3 is rotatable within tube 2 against the resilient force of deformable damping strips 4 lodged in pockets between the rod and tube profiles, these strips being substantially coextensive in length with the tube.

Figure 2:
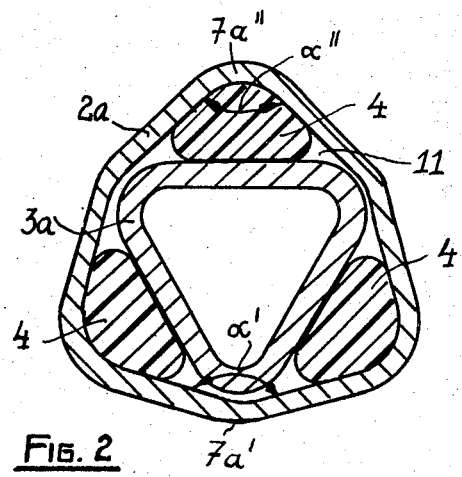
FIG. 2 is a cross-sectional view, drawn to a larger scale, of a rod and an axle housing forming part of the assembly of FIG. 1.

In FIG. 2 the rod $3a$ has been shown as a hollow profile of equilaterally triangular cross-section with rounded edges normally confronting respective corners $7a'$ of the generally hexagonal profile of a surrounding tube $2a$. Other, rounded corners $7a''$ of the tube $2a$ simultaneously overlie the centers of corresponding sides of the rod profile and define therewith three elongate pockets 11 of generally triangular cross-section accommodating respective damping strips 4. It will be noted that the angles $\alpha$ at the corners $7a'$ are larger than the angles $\alpha''$ at the corners $7a''$, i.e., at the vertices of the triangular spaces 11, but that all these angles are obtuse, being somewhat greater than 120° in the case of angles $\alpha'$ and somewhat less than that value in the case of angles $\alpha''$.

Upon rotation of rod $3a$ relative to tube $2a$, the strips 4 undergo rolling deformation within their pockets and elastically resist the rotation of the rod which is therefore returned to its normal position as soon as the stress acting upon the eccentric wheel mounts 5, 10 (FIG. 1) has ceased. Shifting slightly from their illustrated positions, the strips 4 roll around their own axes and are progressively compressed between the two relatively rotating bodies without, however, being squeezed flat against an adjoining housing wall substantially perpendicular to the direction of motion as would be the case with conventional wheel axles of this general type.

Figure 3:
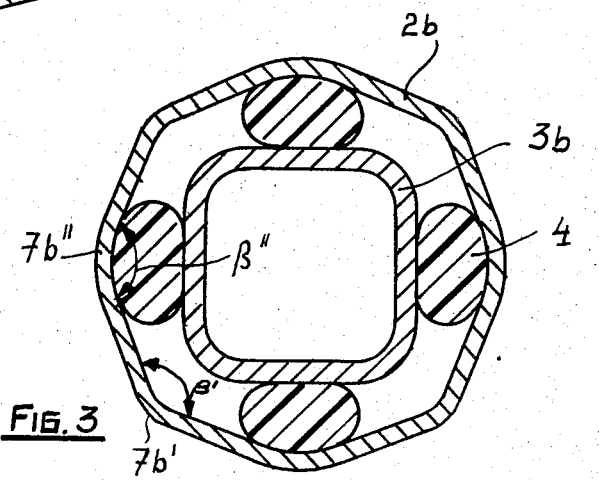
FIG. 3 is a view similar to FIG. 2, showing a modified profile of an axle housing and a rod nested therein.

FIG. 3 shows a tube $2b$ of generally octagonal cross-section and a tube $3b$ of generally square profile separated from each other by four interposed damping strips 4, the tube profile being again formed with a first set of corners $7b'$ normally confronting respective corners of the rod profile and with a second set of corners 7b'' normally overlying the centerlines of the rod sides. In this embodiment, the angles $\beta'$ and $\beta''$ at corners 7b' and 7b'' are substantially identical and equal to about 135°.

Figure 4:
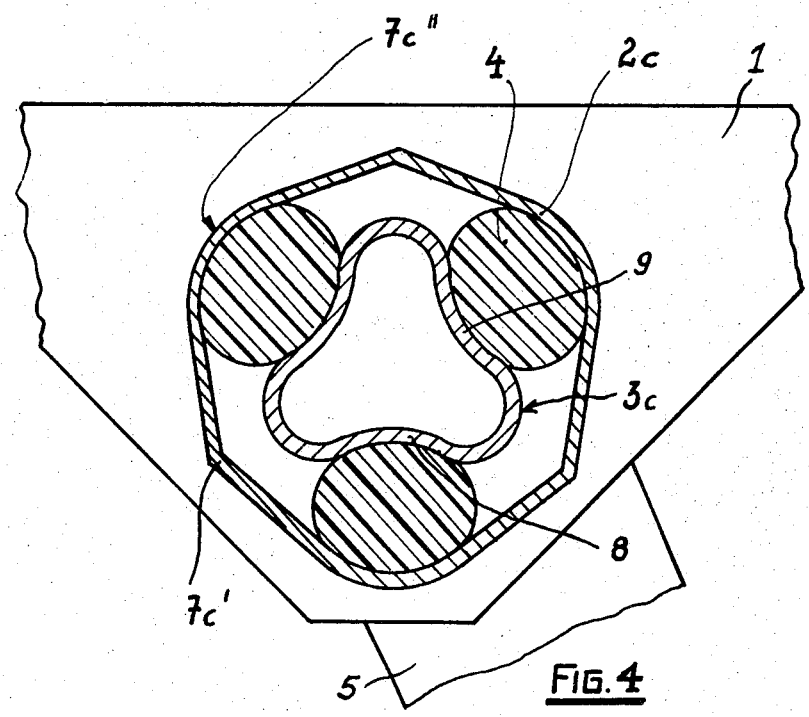
FIG. 4 is another view similar to FIG. 2, illustrating a modification.
Figure 5:
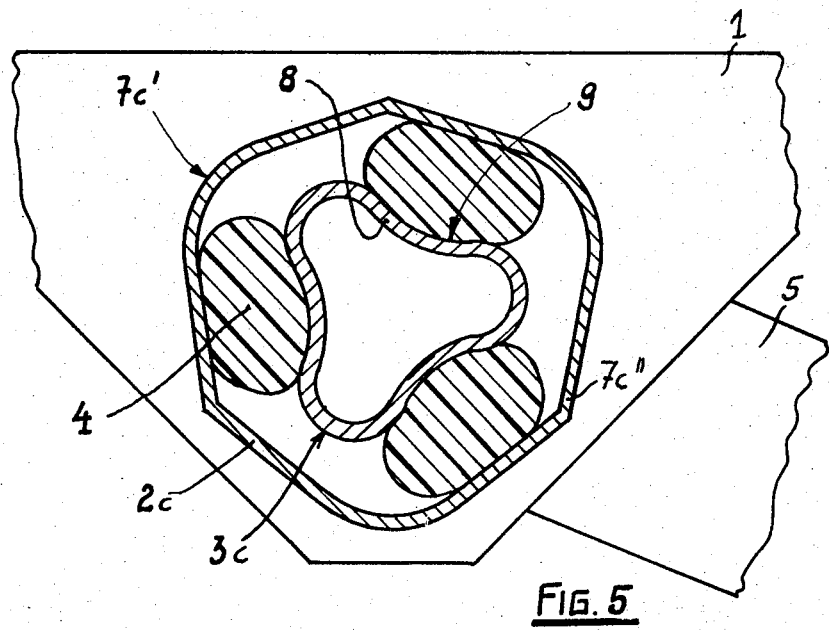
FIG. 5 is a view similar to FIG. 4, showing the assembly thereof in an alternate position.

In FIGS. 4 and 5 I have shown a tube 2c, similar to tube 2a of FIG. 2, surrounding a rod 3c whose generally triangular profile has its sides 8 curved inwardly to form troughs 9 which accommodate part of the corresponding strips 4. It will be noted that the radius of curvature of the concavities 9 roughly equals that of the rounded corners 7c'' confronting the troughs 9 in the normal position of FIG. 4. In this embodiment, again, the angles at corners 7c' opposite the rod edges are somewhat greater than those at the vertices 7c'' of the pocket profiles, the latter being however also in excess of 90°.

The damping strips 4, which may consist of natural or synthetic elastomeric material, may have a circular cross-section when uncompressed so as to exert a certain biasing force upon the rod even in the normal position illustrated in FIGS. 2, 3 and 4. Where such a biasing force is not required, the strips 4 could also be extruded with a shape as illustrated in these Figures.

The assemblies herein disclosed have been tested on rough roads and were found to absorb even heavy impacts, such as those caused by potholes, to a surprising degree. I ascribe this to the fact that the damping strips are not stressed to the limit of their elastic compressibility, even in the presence of severe shocks, since they always have a certain residual mobility in tangential direction.

I claim:

1. A wheel axle for a single-axle vehicle, comprising:
   a tubular axle housing of generally polygonal cross-section;
   a rod of generally polygonal cross-section traversing said axle housing with freedom of relative rotation, said rod having a pair of extremities projecting from said axle housing, the polygon of said axle housing being of a higher order than that of said rod and forming a first set of corners confronting respective corners of the rod polygon along with a second set of corners confronting the sides of said rod polygon to form therewith elongate pockets of generally triangular profile, all of said corners of the housing polygon having obtuse angles;
   a pair of laterally extending arms secured to said extremities, said arms being provided with wheel bearings offset from the axis of said rod; and
   a plurality of elongate damping strips of elastically deformable material respectively received in said pockets to resist relative rotation of said rod and said axle housing.

2. A wheel axle as defined in claim 1 wherein the number of sides of said rod is at most equal to four.

3. A wheel axle as defined in claim 2 wherein the number of corners of said axle housing is double the number of corners of said rod.

4. A wheel axle as defined in claim 3 wherein the angles of at least one set of corners of said housing polygon are equal to at least 120°.

5. A wheel axle as defined in claim 4 wherein the polygon of said axle housing is a hexagon, the angles of said first set exceeding the angles of said second set of corners.

6. A wheel axle as defined in claim 4 wherein the polygon of said axle housing is an octagon, the angles of said first set substantially equaling those of said second set of corners.

7. A wheel axle as defined in claim 1 wherein said axle housing is internally rounded at said second set of corners.

8. A wheel axle as defined in claim 1 wherein said sides of said rod are concave and form elongate troughs partly receiving said damping strips.

9. A wheel axle for a single-axle vehicle, comprising:
   a tubular axle housing of generally polygonal cross-section;
   a rod of generally polygonal cross-section traversing said axle housing with freedom of relative rotation, said rod having a pair of extremities projecting from said axle housing, the sides of the rod polygon being provided with central longitudinal troughs of arcuate profile and forming clearances with confronting corners of the polygon of the axle housing, said axle housing being rounded at said confronting corners with a radius of curvature approximately equaling that of said troughs;
   a pair of laterally extending arms secured to said extremities, said arms being provided with wheel bearings offset from the axis of said rod; and
   a plurality of elongate damping strips of elastically deformable material respectively received in said clearances to resist relative rotation of said rod and said axle housing.

* * * * *